(12) United States Patent
Asthana et al.

(10) Patent No.: US 12,705,122 B2
(45) Date of Patent: Aug. 11, 2026

(54) CONFIGURATION DISTRIBUTION HEALTH EVALUATION FOR COMPUTING RESOURCES

(71) Applicant: Microsoft Technology Licensing, LLC, Redmond, WA (US)

(72) Inventors: Arpan Kumar Asthana, Sammamish, WA (US); Imran Sargusingh, Bothell, WA (US); Anastasiia Byvsheva, Seattle, WA (US); Maxime Caron, Woodinville, WA (US); Pragati Gupta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/811,651

(22) Filed: Aug. 21, 2024

(65) Prior Publication Data

US 2026/0056815 A1 Feb. 26, 2026

(51) Int. Cl.
*G06F 11/00* (2006.01)
*G06F 8/65* (2018.01)

(52) U.S. Cl.
CPC .............. *G06F 11/008* (2013.01); *G06F 8/65* (2013.01)

(58) Field of Classification Search
CPC ................................. G06F 11/008; G06F 8/65
See application file for complete search history.

(56) References Cited

U.S. PATENT DOCUMENTS 9,916,233 B1 * 3/2018 Qureshi .............. G06F 11/3688
2017/0115978 A1 * 4/2017 Modi ........................ G06F 8/65
2019/0250929 A1 8/2019 Pasirstein
2021/0132957 A1 * 5/2021 Wang .................... G06F 9/5072
2022/0138070 A1 5/2022 Mokashi
2023/0111430 A1 * 4/2023 Wu ....................... G06F 9/4411
2023/0297680 A1 * 9/2023 Bose ..................... G06F 21/572 726/22
2024/0113950 A1 4/2024 Chitalia
2024/0119763 A1 * 4/2024 Tomatsu .................. G06F 8/65

FOREIGN PATENT DOCUMENTS

CN 110413287 A 11/2019

* cited by examiner

*Primary Examiner* — Bryce P Bonzo
*Assistant Examiner* — Xinyuan Yu
(74) *Attorney, Agent, or Firm* — Weaver IP L.L.C.

(57) ABSTRACT

Systems, methods, and computer readable storage mediums are disclosed herein for evaluating a health of a configuration distribution. In an example system, at least one health signal is obtained relating to the distribution of a configuration. In one implementation, a first health signal is obtained indicative of a transmission of the configuration to a target computing resource. A second health signal is obtained indicative of a consumption of the configuration. A third health signal is obtained indicative of a health of a computing platform that includes the target computing resource after the consumption. Based on the first health signal, the second health signal, and the third health signal, the health of the configuration distribution is determined. In an illustration, the health of the configuration distribution is determined to be in a healthy state, unhealthy state, or another state.

20 Claims, 5 Drawing Sheets

Obtain a first health signal indicative of a transmission of the configuration to a target computing resource — 302

Obtain a second health signal indicative of a consumption of the configuration — 304

Obtain a third health signal indicative of a health of a computing platform that includes the target computing resource after the consumption — 306

Based on the first health signal, the second health signal, and the third health signal, determine the health of the configuration distribution — 308

300

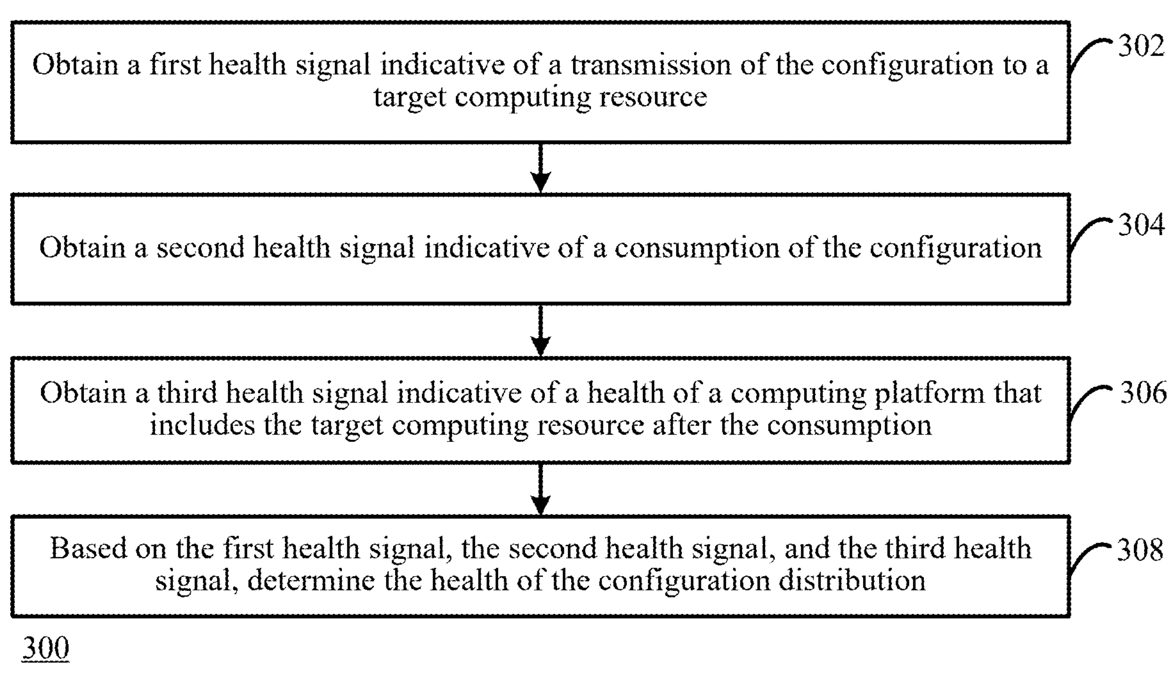
FIG. 3
Perform a system health action based on the health of the configuration distribution
402
400
FIG. 4
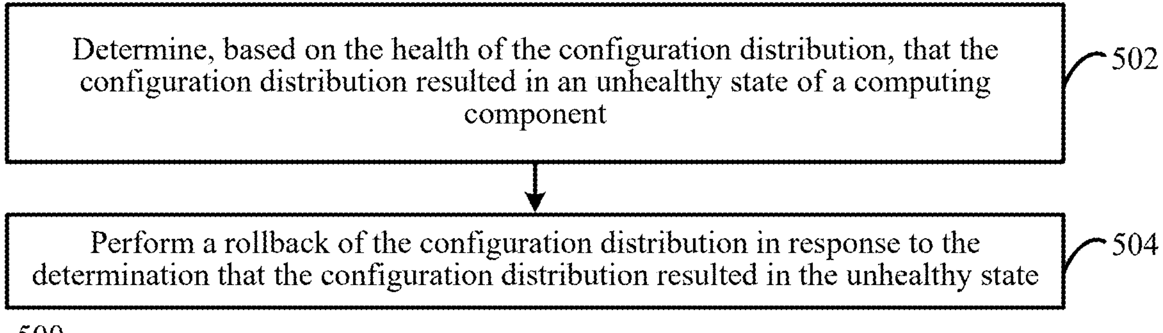
FIG. 5

CONFIGURATION DISTRIBUTION HEALTH EVALUATION FOR COMPUTING RESOURCES

BACKGROUND

In modern computing environments, such as cloud environments, resources are often configured by a management entity. In one illustration, a configuration provided to a resource may be designed to serve as an update for that resource for security purposes. However, given that configurations are designed with the aid of software developers, these configurations can include errors in some instances, causing configuration-related outages for a resource. These outages, in turn, result in disruptions for end-users that are unable to access or otherwise utilize the resource.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer readable storage mediums are disclosed herein for evaluating a health of a configuration distribution. In an example system, at least one health signal is obtained relating to the distribution of a configuration. In one implementation, a first health signal is obtained indicative of a transmission of the configuration to a target computing resource. A second health signal is obtained indicative of a consumption of the configuration. A third health signal is obtained indicative of a health of a computing platform that includes the target computing resource after the consumption. Based on the first health signal, the second health signal, and the third health signal, the health of the configuration distribution is determined. In an illustration, the health of the configuration distribution is determined to be in a healthy state, unhealthy state, or another state.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart of a method for evaluating a health of a configuration distribution, in accordance with an example embodiment.

FIG. 4 shows a flowchart of a method for performing a system health action based on health determination, accordance with an example embodiment.

FIG. 5 shows a flowchart of a method for rolling back a configuration distribution based on a configuration distribution health, in accordance with an example embodiment.

Figure 1:
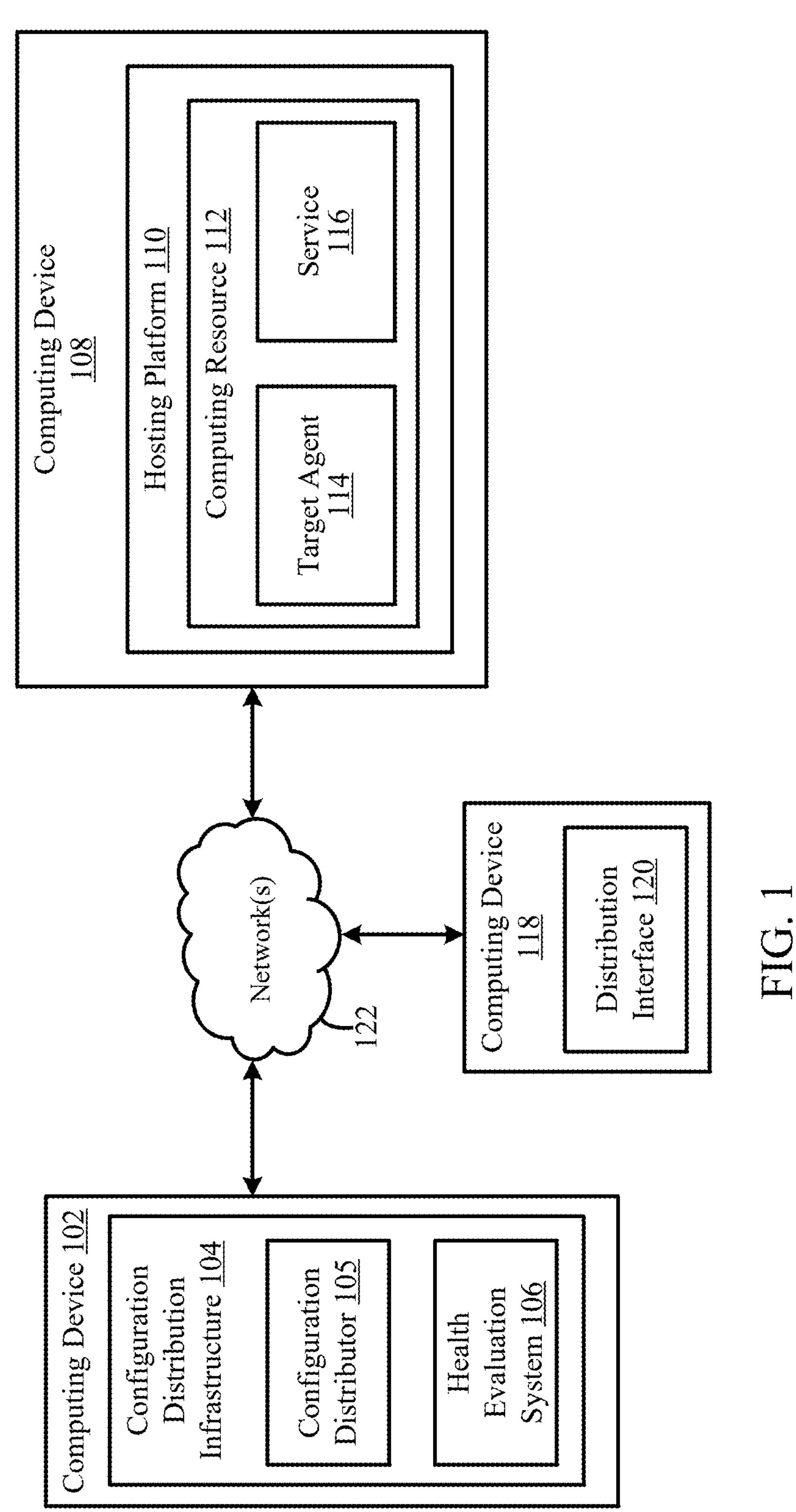
FIG. 1 shows a block diagram of system for evaluating the health of a configuration distribution, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In modern computing environments, such as cloud environments, resources are often configured by a management entity. In one illustration, a configuration provided to a resource may be designed to serve as an update for that resource for security purposes. However, given that configurations are designed with the aid of software developers, these configurations can include errors in some instances, causing configuration-related outages for a resource. These outages, in turn, result in disruptions for end-users that are unable to access or otherwise utilize the resource and/or revenue loss to a provider of the resource.

Configuration management serves a variety of purposes, including but not limited to, maintaining system integrity, version control, change management, risk mitigation, and scalability. While such aspects are designed generally for improving the operation and/or functionality of a resource, errors in the configuration that are introduced inadvertently potentially leads to system failures and/or downtime of a resource.

Existing techniques fail to adequately address problems that occur with respect to distributions. Absent such techniques, a target that receives a faulty configuration change can result in a malfunction and/or outage due to the incorrect configuration. Such a challenge becomes increasingly difficult to address when a target fleet that is intended to receive a configuration is relatively large (e.g., in the thousands or millions).

Embodiments described herein are directed to evaluating a health of a configuration distribution. In an example system, at least one health signal is obtained relating to the distribution of a configuration. In one implementation, a first health signal is obtained indicative of a transmission of the configuration to a target computing resource. A second health signal is obtained indicative of a consumption of the configuration. A third health signal is obtained indicative of a health of a computing platform that includes the target computing resource after the consumption. Based on the first health signal, the second health signal, and the third health signal, the health of the configuration distribution is determined. In an illustration, the health of the configuration distribution is determined to be in a healthy state, unhealthy state, or another state.

Evaluating the health of a configuration distribution as described herein has numerous advantages, including but not limited to improving the functioning and/or performance of computing resources. For example, the health evaluation is performed based on various health signals, each relating to a different dimension of the distribution. Evaluating the health based on one or more of these health signals allows the health of a distribution to be evaluated in a more accurate fashion, enabling a distribution infrastructure to better deploy (or not deploy) configurations to different targets. For instance, where the health signal indicates problems with the distribution in a particular one of the dimensions (e.g., a problem with an over utilization of resources following the distribution), the configuration can be paused to prevent further disruptions to a computing platform that includes the target computing resource until the configuration is fixed and/or rolled back to a previous state. In such a manner, the distribution of a faulty configuration on a large number of targets can be prevented, thereby ensuring that the targets continue to operate with little to no outages. In addition, since the health check can be performed in near real-time, the configuration distribution can proceed (or not proceed) with reduced latency.

Still further, where a configuration distribution is deemed to be healthy based on the health signals, an updated rollback state (e.g., also referred to as a last known good (LKG) state) can be set based on the configuration distribution, thereby allowing a future configuration distribution to rely on the LKG where the future configuration is faulty. Thus, in situations where the configuration distribution is healthy, further improvements relating to the functionality of a computing device are achieved, such as by ensuring that the computing device operates with little downtime.

Still further, disclosed techniques for evaluating the health of a configuration distribution allows for various other improvements to computing resources, including but not limited to improving the overall performance thereof. For instance, many configurations are distributed in a manner that enables target computing resources to improve processor, memory and/or network resource utilization (e.g., by altering the functionality of a service that improves the performance thereof). By ensuring that such configurations are distributed in a healthy manner, the performance improvements relating to those configurations can be successfully achieved on the targets.

Accordingly, disclosed techniques allow for the effective addressing and mitigation of configuration-related outages. The foregoing examples are only illustrative, and various other advantages are achieved in accordance with the disclosed techniques.

Embodiments for evaluating the health of a configuration distribution are implemented in various way. For instance, FIG. 1 shows a block diagram of system 100 for evaluating the health of a configuration distribution, in accordance with an example embodiment. As shown in FIG. 1, system 100 includes a computing device 102, a computing device 108, and a computing device 118. In FIG. 1, computing device 102, computing device 108, and computing device 118 are communicatively coupled via a network 122. Computing device 102 includes a configuration distribution infrastructure 104. Configuration distribution infrastructure 104 includes a configuration distributor 105 and a health evaluation system 106. Computing device 108 includes a hosting platform 110. As shown in FIG. 1, hosting platform includes a computing resource 112. Computing resource 112 includes a target agent 114 and a service 116. Computing device 118 includes a distribution interface 120. An example device that incorporates the functionality of computing device 102, computing device 118, and/or computing device 118 (or any subcomponents therein, whether or not illustrated in FIG. 1) is described below in reference to FIG. 8. It is noted that system 100 comprises any number of devices in example embodiments, including those illustrated in FIG. 1 and optionally one or more further devices or components not expressly illustrated. System 100 is further described as follows.

In an example implementation, network 122 includes one or more of any of a local area network (LAN), a wide area network (WAN), a personal area network (PAN), a combination of communication networks, such as the Internet, and/or a virtual network. In example implementations, computing device 102, computing device 118, and/or computing device 118 communicate via network 122. In an implementation, any one or more of computing device 102, computing device 118, and/or computing device 118 communicate over network 122 via one or more application programming interfaces (API) and/or according to other interfaces and/or techniques. In an example, computing device 102, computing device 118, and/or computing device 118 each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

In examples, computing device 102 comprises any one or more computing devices, servers, services, local processes, remote machines, web services, etc. for interacting with one or more components of hosting platform 110 to distribute a configuration thereto. In various embodiments, configuration distribution infrastructure 104 of computing device 102 comprises programming instructions executable thereon that enables a configuration to be provided to a component of hosting platform, such as by transmitting the configuration information, a notification indicating an availability of the configuration information, or in accordance with any other technique which allows a component of hosting platform 110 to access the configuration information. In various examples, configuration distribution infrastructure 104 allows interaction between components therein (e.g., configuration distributor 105 and/or health evaluation system 106) with an interface, such as distribution interface 120, such as for the operation and/or management of configuration distribution infrastructure 104. Such interaction includes, but is not limited to, managing, configuring, viewing, creating, deleting, changing, pushing, or otherwise accessing configuration information and/or related health information. In some implementations, configuration distribution infrastructure 104 interacts with a fleet of machines (e.g., virtual machines, physical machines, etc.) to distribute configurations thereto. In some examples, the configuration settings are distributed for one or more services operating across multiple regions (e.g., geographic regions), divisions, etc. within a cloud.

In examples, computing device 102 is configured to execute configuration distribution infrastructure 104 (including components therein), such as by executing executable code (e.g., software) installed on computing device 102, a web browser, or other code that launches configuration distribution infrastructure 104. In some implementations, configuration distribution infrastructure 104 is accessible via a cloud.

In examples, computing device 102 comprises any type of stationary or mobile computing device, including a mobile computer or mobile computing device (e.g., a Microsoft® Surface® device, a personal digital assistant (PDA), a laptop computer, a notebook computer, a tablet computer, a netbook, etc.), a desktop computer, a server, a mobile phone or handheld device (e.g., a cell phone, a smart phone, etc.), a wearable computing device (e.g., a head-mounted device including smart glasses, a smart watch, etc.), an Internet-of-Things (IoT) device, or other type of stationary or mobile device. Computing device 102 is not limited to a physical machine, but include other types of machines or nodes, such as a virtual machine in various examples. In accordance with an embodiment, computing device 102 is associated with a user (e.g., an individual user, a group of users, an organization, a family user, a customer user, an employee user, an admin user (e.g., a service team user, a developer user, a management user, etc.), etc.). In an example, computing device 102 interfaces with other components illustrated in FIG. 1 through APIs and/or by other mechanisms.

Configuration distribution infrastructure 104 comprise an infrastructure (e.g., one or more computing components) configured to distribute a configuration to one more targets, such as a component of hosting platform 110. In examples, a configuration comprises data that defines a functionality of a target resource, such as service 116. In various implementations, the functionality relates to any aspect of the target resource that, such as end user facing features, features that are not visible to end users, and/or other features. In some implementations, the configuration defines parameters (e.g., as a knob, slider, set of values, etc.) in which a functionality of the target resource is added, deleted, enabled, disabled, altered, etc. Accordingly, in various examples, the configuration as used herein comprises data that changes (e.g., customizes) the behavior of a target resource (e.g., the behavior of service 116). In illustrations, the configuration comprises one or more settings for a service to customize a behavior thereof and/or enable or disable functionalities thereof, such as live site migration, feature flighting, phrased rollout of functionalities, etc.

As will be described in greater detail below, the target resource comprises any computing resource, such as a cloud computing resource (e.g., a service executing on the cloud or otherwise accessible via the cloud), software executing on a computing device, etc. In examples, the configuration comprises any suitable data format or structure, including but not limited to feature flags, key value pairs, Extensible Markup Language (XML), JavaScript Object Notation (JSON), Yet Another Markup Language (YAML), blobs, etc. In implementations, the configuration comprises a single file or a collection of files.

Configuration distributor 105 is configured to distribute a configuration to one or more components of hosting platform 110, such as to target agent 114. As used herein, the distribution of a configuration comprises transmission of the configuration in some examples. In another example, the distribution comprises a notification or a signal indicating (e.g., to target agent 114) that the configuration is available or otherwise accessible (e.g., downloadable) from a source, such as a cloud-based storage, from computing device 102, or from another location. In examples, configuration distributor 105 is configured to distribute the configuration automatically, based on a scheduled distribution (e.g., during a period of non-use or reduced demand), or in response to a user input (e.g., via distribution interface 120).

Health evaluation system 106 is configured to determine a health of a configuration distribution. For instance, where configuration distributor 105 distributes a configuration for consumption by one or more target resources, health evaluation system 106 is configured to obtain one or more health signals relating to the distribution. In one implementation, health evaluation system 106 receives a first health signal indicative of whether the configuration was successfully delivered, such as whether the configuration was successfully stored on a storage device accessible by the target resource. In another implementation, health evaluation system 106 receives a second health signal indicative of whether the configuration was successfully consumed by a target resource (e.g., service 116). In another implementation, health evaluation system 106 receives a third health signal indicative of whether the platform on which the target resource resides is in a healthy or unhealthy state following the consumption of the configuration. Additional details relating to such health signals are described in greater detail below.

Based on the one or more health signals that are received, health evaluation system 106 determines a health associated with the configuration distribution. In one example, the health comprises an indication of whether the configuration distribution was healthy (e.g., successful) or unhealthy (e.g., unsuccessful). For instance, where each of the signals that are received indicates a positive heath signal (e.g., successful delivery, successful consumption, and a healthy platform in an illustration), the configuration distribution is determined to be healthy. In response, various types of actions can be performed, such as to continue with the configuration distribution to one or more additional targets, defining a new LKG rollback state, etc.

In another example, such as where the configuration distribution was unhealthy, one or more different actions can be performed, such as to pause the configuration distribution, rollback the configuration to a previous configuration based on a LKG rollback point, or some other actions. Additional examples are described in greater detail below.

In examples, computing device 118 comprises any one or more computing devices, servers, services, local processes, remote machines, web services, etc. for interacting with configuration distribution infrastructure 104. In various embodiments, distribution interface 120 comprises one or more user interactive controls (e.g., buttons, menus, alphanumeric input fields, icons, windows, etc.) that enables a user of computing device 118 to operate and/or manage various aspects of configuration distribution infrastructure

104, such as by developing configurations for distribution, identifying target resources that are to receive the configurations, initiating or scheduling a distribution, controlling the manner in which the health is determined, viewing health information generated by health evaluation system 106, etc. In one example, distribution interface 120 comprises one or more interactive controls to define the manner in which a health of a configuration distribution is determined (e.g., by selecting and/or weighting one or more health signals that are relied upon by health evaluation system 106). For instance, distribution interface 120 comprises an interactive control to enable a user to select a subset of health signals described herein that are to be used by health evaluation system 106.

For instance, distribution interface 120 presents information obtained by and/or generated by health evaluation system 106. In examples, computing device 118 is configured to execute code to launch distribution interface 120, such as by executing software installed on computing device 102, a web browser, or other code that launches distribution interface 120. In some implementations, distribution interface 120 is accessible via a cloud. Additional details regarding the operation and/or functionality of distribution interface 120 are described elsewhere herein.

In examples, computing device 118 comprises any type of stationary or mobile computing device, including a mobile computer or mobile computing device (e.g., a Microsoft® Surface® device, a personal digital assistant (PDA), a laptop computer, a notebook computer, a tablet computer, a netbook, etc.), a desktop computer, a server, a mobile phone or handheld device (e.g., a cell phone, a smart phone, etc.), a wearable computing device (e.g., a head-mounted device including smart glasses, a smart watch, etc.), an Internet-of-Things (IOT) device, or other type of stationary or mobile device. Computing device 108 is not limited to a physical machine, but include other types of machines or nodes, such as a virtual machine in various examples. In accordance with an embodiment, computing device 108 is associated with a user (e.g., an individual user, a group of users, an organization, a family user, a customer user, an employee user, an admin user (e.g., a service team user, a developer user, a management user, etc.), etc.). In an example, computing device 108 interfaces with other components illustrated in FIG. 1 through APIs and/or by other mechanisms.

Computing device 108 comprises any number of computing devices such as a network-accessible server (e.g., a cloud computing server network), services, local processes, remote machines, web services, etc. for hosting, managing, and/or providing access to one or more services, such as a cloud-based service. In an example, computing device 108 comprises a group or collection of servers (e.g., computing devices) that are each accessible by a network such as the Internet (e.g., in a "cloud-based" embodiment). In example embodiments, computing device 108 is a computing device that is located remotely (e.g., in a different facility) from computing device 102 and/or computing device 118. Computing device 108 comprises any number of computing devices, and includes any type and number of other resources, including resources that facilitate communications with and between servers, storage by the servers, etc. (e.g., network switches, storage devices, networks, etc.). In embodiments, devices of computing device 108 are co-located (e.g., housed in one or more nearby buildings with associated components such as backup power supplies, redundant data communications, environmental controls, etc.) to form a datacenter, or are arranged in other manners. Accordingly, in an embodiment, computing device 108 is a datacenter in a distributed collection of datacenters.

Hosting platform 110 is configured to comprises any combination of hardware and/or software to host, manage, and/or provide access to various services, such as service 116. In an example, hosting platform 110 defines a connection between a plurality of machines to form a cloud environment (e.g., a cloud services environment) where one o or more cloud services are provided across one or more tenants. In an example, a single hosting platform is present to manage a plurality of computing resources 112, where each computing resource 112 comprises a different machine, such as a virtual machine (VM), a node, a container, a physical machine, etc. In another example, a plurality of hosting platforms are present to manage one or more computing resources. For instance, hosting platform 110 is configured to host a particular service that comprises a multi-tenant service (e.g., a service that services multiple different or unaffiliated tenants). In another example, hosting platform 110 is configure to host a plurality of services that each comprise muti-tenant services. Accordingly, while FIG. 1 illustrates only a single hosting platform and a single computing resource, it should be understood that any number of hosting platforms and computing resources are possible in accordance with the disclosed techniques.

In an example, computing resource 112 comprises a VM, node, physical machine, container, etc. In one implementation, computing resource 112 comprises an operating system that executes various processes and/or services, such as target agent 114 and service 116. In other words, target agent 114 is an example of an operating system service and/or process (e.g., an executable) executing within computing resource 112. In some examples, target agent 114 is a separate process from service 116. In an implementation, target agent 114 comprises a configuration sink that is configured to obtain a configuration (e.g., based on an indication and/or transmission from configuration distributor 105) and perform one or more actions to initiate the consumption of the configuration by one or more services executing on computing resource 112. In various examples, target agent 114 services (e.g., manages) a plurality of services (e.g., all services) executing on computing resource 112, such as service 116 and/or any other services executing thereon. While only a single service is illustrated, it should therefore be understood that any number of services are possible, such that target agent 114 is servicing a plurality of services (each of which can have any number of tenants).

In various examples, target agent 114 provides one or more health signals to health evaluation system 106, such as a health signal indicative of whether a configuration was successfully delivered. Additional details regarding the operation of target agent 114 are described in greater detail below.

Service 116 comprise any type of software or hardware component of a computer (or a combination thereof) that is accessed or utilized by one or more entities and/or in one or more computing environments. In various examples, service 116 comprises cloud resources of a cloud provider. In some examples, service 116 comprises a storage (such as a cloud storage) that contains a collection of information or data that is stored therein. In another example, service 116 comprises an account (e.g., a subscription) to a service, such as a storage account. In another example, service 116 comprises an application service that is configured to execute a set of executable code. In another example, service 116 comprises a registry service in which a subscriber builds, stores, and/or manages container images or artifacts. In another other example, service 116 includes one or more physical or virtual components of a computing device for processing information (e.g., a processor). In examples therefore, service 116 includes, but is not limited to, a computer or processor, a physical host, a virtual machine, software (e.g., software as a service (Saas), a platform as a service (PaaS), etc.), licenses, devices (including network devices), a memory or storage (e.g., physical storage devices, local storage devices, cloud-based storages, disks, hard disk drives, solid state devices (SSDs), random access memory (RAM) devices, etc.), data stored within a storage (e.g., files, databases, etc.) or any other component or data of a computing environment that is accessed or utilized by one or more entities.

Implementations are not limited to the illustrative arrangement shown in FIG. 1. For instance, any of the components shown in FIG. 1 are located in a same computing device, are co-located, or are located remote from each other. Furthermore, system 100 comprises any number of other devices, networks, servers, and/or computing devices coupled in any manner in various embodiments.

Figure 2:
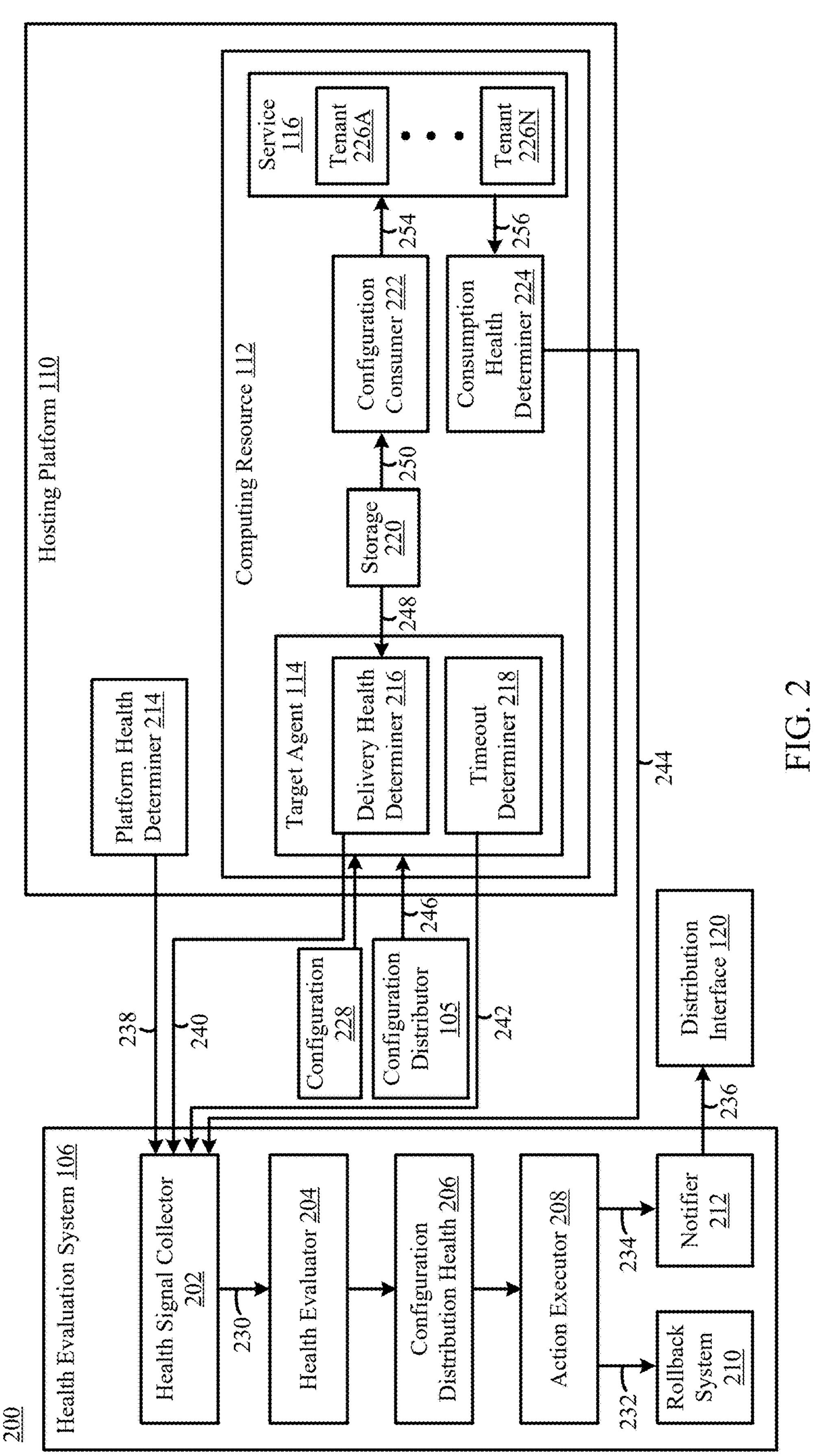
FIG. 2 shows a block diagram of a system for evaluating a health of a configuration distribution, in accordance with another example embodiment.

FIG. 2 depicts a block diagram of a system 200 for evaluating a health of a configuration distribution, in accordance with another example embodiment. As shown in FIG. 2, system 200 includes an example implementation of configuration distributor 105, health evaluation system 106, hosting platform 110, and distribution interface 120. System 200 also includes a configuration 228. Health evaluation system 106 comprises a health signal collector 202, a health evaluator 204, a configuration distribution health 206, an action executor 208, a rollback system 210, and a notifier 212. Hosting platform 110 comprises a platform health determiner 214 and an example implementation of computing resource 112. Computing resource 112 comprises an example implementation of target agent 114 and service 116. Computing resource 112 also comprises a storage 220, a configuration consumer 222, and a consumption health determiner 224. Target agent 114 comprises a delivery health determiner 216 and a timeout determiner 218. Service 116 comprises tenants 226A-226N. System 200 is described as follows.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

In example embodiments, configuration distributor 105 is configured to distribute an indication 246 a configuration 228 to target agent 114. As described previously, configuration distributor 105 is configured to transmit a configuration (e.g., as a file or set of files that defines the behavior of service 116) to target agent 114, a notification that the configuration is accessible (e.g., downloadable) from a source, or any other indication that enable target agent 114 to access the configuration. In various embodiments, configuration distributor 105 distributes the configuration automatically, at a scheduled time, in response to a user input, or via any other trigger. In some implementations, configuration 228 identifies one or more target agents and/or services to which the configuration is to be applied. In some implementations, configuration 228 identifies one or more tenants for which the configuration is to be applied (e.g., consumed).

In an embodiment, target agent 114 is configured to access configuration 228 (e.g., by retrieving the configuration from configuration distributor 105 or from another source) and store configuration 228 in storage 220. In examples, storage 220 comprises any type of persistent storage that is configured to storage data in a manner that retains the data even after power is disconnected from the storage. In various embodiments, storage 220 comprises a non-volatile storage. Storage 220 comprises one or more local or on-premise storage devices, such as physical storage devices (e.g., hard disk drives, flash drives, solid-state drives, optical disk drives, RAM devices, etc.) and/or one or more cloud-based storages. In some embodiments, storage 220 comprises a non-volatile memory.

Delivery health determiner 216 is configured to determine a health associated with the storage of the configuration in storage 220. For instance, delivery health determiner 216 obtains one or more signals 248 to determine whether target agent 114 obtained the configuration and/or wrote the configuration to storage 220. In some implementations, delivery health determiner 216 determines whether target agent 114 verifies whether the configuration was written correctly to storage 220. For instance, delivery health determiner 216 determines whether the configuration (e.g., the file or set of files) was written in a manner that the configuration was not corrupt (e.g., by reading the bytes stored to the disk). In another example, delivery health determiner 216 verifies a hash associated with the copied configuration to determine whether the configuration was copied to storage 220 correctly. In another example, delivery health determiner 216 determines an integrity of the configuration written to storage 220 to verify whether the file was not altered during transit (e.g., from the source to target agent 114). In another example, delivery health determiner 216 determines whether the configuration was saved to storage 220. Accordingly, in various embodiments, delivery health determiner 216 acknowledges whether the configuration was successfully copied to a file system of computing resource 112 successfully.

In examples, delivery health determiner 216 generates a first health signal 240 indicative of the transmission of the configuration to computing resource 112, based e.g., on any one or more of the foregoing determinations and/or verifications. For instance, if delivery health determiner 216 determines that the configuration was successfully copied to storage 220, delivery health determiner 216 generates first health signal 240 indicating that the transmission of the configuration was successful (e.g., that a successfully delivery of the configuration to storage 220 has occurred). In other examples, such as where any one or more of the foregoing determinations and/or verifications was unsuccessful, delivery health determiner 216 generates first health signal 240 indicating that the transmission was unsuccessful (e.g., unhealthy). In some implementations, first health signal 240 comprises information indicative of a reason for the successful and/or unsuccessful transmission, such as granular information indicative of whether the file was downloaded properly, whether it was corrupted, whether an integrity verification passed, etc. Accordingly, the first health signal indicates a reason for the success and/or failure of the transmission in various embodiments.

In various embodiments, delivery health determiner 216 transmits first health signal 240 to health signal collector 202. In this manner, health signal collector 202 obtains information indicative of whether the configuration was delivered to computing resource 112 in a healthy and/or unhealthy manner, and/or one or more associated reasons.

As a result, health signal collector 202 obtains information indicating whether a first dimension of the configuration (e.g., the delivery of the configuration) was successful or unsuccessful.

In some further implementations, heath signal collector 202 does not receive an explicit signal from delivery health determiner 216 indicative of whether the configuration was successfully delivered to storage 220. For instance, health signal collector 202 determines in some examples that delivery health determiner 216 has not responded (e.g., after a timeout period, or a predetermined period of time after configuration distributor 105 distributes the configuration to target agent 114). In such an example, health signal collector 202 determines (e.g., generates) a first health signal indicating that the delivery was unsuccessful due to a response not being received from delivery health determiner 216. In this manner, an inference is made that the delivery was unsuccessful where target agent 114 failed to respond with a positive or negative health signal indicative of the delivery of the configuration.

In embodiments, configuration consumer 222 is configured to obtain 250 the configuration from storage 220 and consume 254 the configuration such that the configuration is applied to service 116. In various examples, the consumption of the configuration comprises updating an existing configuration, replacing an existing configuration, adding an additional configuration, etc. such that one or more behaviors of service 116 are changed (e.g., a behavior is added, deleted, enabled, altered, etc.). In some implementations, configuration consumer 222 is configured to restart service 116 after the configuration obtained from storage 220 is consumed.

As discussed herein, in some examples, configuration consumer 222 causes the configuration to be consumed by a specific tenant (e.g., as specified by the configuration or information transmitted along with the configuration). In some other examples, configuration consumer 222 causes the configuration to be consumed by a plurality of tenants (e.g., a plurality of tenants 226A-226N) of service 116. As used herein, a target of the configuration for consumption comprises any of service 116 and/or tenants 226A-226N.

For each tenant that consumed the configuration, consumption health determiner 224 obtains one or more signals 256 to generate a second health signal indicative of whether the tenant consumed (e.g., read and/or applied) the configuration successfully. For instance, if a single tenant consumed the configuration, consumption health determiner 224 generates a health signal indicating whether that tenant successfully consumed the configuration. In other examples, such as where multiple tenants consumed the configuration, consumption health determiner 224 generates a health signal for each tenant that consumed the configuration, indicative of whether each tenant successfully consumed the configuration. In various embodiments, the health signal generated by consumption health determiner 224 also identifies the tenant (e.g., using a tenant identifier) associated with the health signal. In this manner, the health signal is generated on a per-tenant basis for service 116, thereby allowing the consumption health to be determined in a more granular fashion.

Consumption health determiner 224 operates in various ways to determine whether a successful consumption of the configuration has occurred. For instance, after a tenant (e.g., tenant 226A) parses the configuration and consumes it, tenant 226A generates an indication indicating whether the consumption was successful or unsuccessful. Such an indication is provided to consumption health determiner 224 in examples, which then generates a second health signal based thereon. In other examples, the indication generated by the tenant comprises the second health signal (e.g., in implementations where consumption health determiner 224 is implemented as part of service 116 and/or one or more tenants).

As an illustration, a configuration can comprise a change to a packet size from a first packet size to a second packet size. After service 116 (or a tenant) consumes the configuration, configuration health determiner 224 determines whether the packet size of service 116 matches the configuration that was consumed. If the packet size matches, consumption health determiner 224 determines that the consumption was successful and generates a corresponding health signal. If the packet size does not match, consumption health determiner 224 determines that the consumption was unsuccessful and generates an associated health signal indicating that the consumption was unsuccessful. Thus, consumption health determiner 224 validates whether the configuration was successfully applied or not by service 116 (and/or one or more tenants of the service), and generates a second health signal 244 (also referred to as "explicit" feedback) based thereon.

In various examples, consumption health determiner 224 generates the second health signal to include associated information for the consumption, such as one or more reasons (e.g., error codes, error messages, etc.) associated with the successful or unsuccessful consumption of the configuration. In implementations, second health signal 244 (and/or any associated information) is provided to health signal collector 202.

In various other embodiments, consumption health determiner 224 does not receive or generate an indication that the consumption was successful or unsuccessful. For instance, consumption of the configuration by service 116 can cause the service or a tenant to crash, enter an infinite loop, etc., resulting in a non-response following the consumption. In such an example where a validation is not received, timeout determiner 218 determines that a second health signal was not generated by consumption health determiner 224. In this situation, timeout determiner 218 generates a health signal 242 indicating that the consumption was unsuccessful (e.g., due to the non-response). Thus, where a tenant or service fails to respond indicating whether the consumption was successful or unsuccessful, an inference is made that the consumption was unsuccessful and a corresponding health signal (also referred to as "implicit" feedback) is generated (e.g., by target agent 114) following a passage of the timeout period in which the service and/or a tenant associated therewith failed to respond with consumption health information (e.g., a signal indicative of whether the target successfully consumed the configuration). In examples, health signal collector 202 receives such a signal indicating that the consumption of the configuration distribution was unsuccessful from target agent 114 (or from any other entity).

It should be noted that subcomponents in FIG. 2 are depicted only to illustrate an example implementation of the disclosed techniques, and are not intended to be limiting. For instance, the second health signal (and/or other signals described herein) need not originate from or be generated by a particular entity as illustrated. For example, example embodiments are described in which consumption health determiner 224 generates second health signal 244 to provide to health signal collector 202. However, in other embodiments, service 116 (and/or a tenant of the service) generates and provides the second health signal to health signal collector 202. In other embodiments, the second health signal is provided to target agent 114 (or was failed to be provided, such as in the case of crashes or the like), and target agent 114 provides the second health signal to health signal collector 202. Thus, health signal collector 202 obtains the second health signal from various components, and is not limited to the particular illustration as depicted in FIG. 2.

Accordingly, health signal collector 202 is configured to receive a second health signal indicative of a consumption (e.g., application or ingestion) of the configuration. For instance, health signal collector 202 receives the second health signal that indicates whether service 116 (and/or one or more tenant(s) of the service) successfully (or unsuccessfully) consumed the configuration. In some implementations, health signal collector 202 also receives, as part of the second health signal or in addition thereto, additional information relating to the consumption, such as one or more reasons (e.g., error codes) relating to the successful or unsuccessful consumption of the configuration.

Thus, in various example embodiments, health signal collector 202 receives a first and second health signal that indicates whether a configuration was successfully delivered (e.g., stored) and/or consumed (e.g., applied).

In various implementations, platform health determiner 214 is configured to determine a health of hosting platform 110. In some examples, platform health determiner 214 determines the health of hosting platform based on any one or more factors, such as a current processor utilization, memory utilization, network utilization, latency, error codes generated on the platform, or various other factors. In some implementations, platform health determiner 214 generates such health information based on a monitoring of resources of the platform. In other implementations, platform health determiner 214 reads the health information from one or more components of the platform. For instance, platform health determiner 214 determines the health of the platform based on a health of one or more of a processing resource (e.g., a CPU, GPU, or other processor), a storage resource (e.g., a disk, memory, etc.), a networking resource (e.g., a latency, bandwidth usage, etc.), or any other computing resource.

In various embodiments, platform health determiner 214 determines the health of the platform after the storage and/or consumption of the configuration (e.g., after the passage of a predetermined period of time). For instance, platform health determiner 214 determines the health of the platform after a predetermined time period has passed since a tenant consumed the configuration (e.g., 10 minutes after the consumption). For example, if platform health determiner 214 determines that an excessive amount of memory is utilized following consumption of the configuration, platform health determiner 214 determines that the health of the platform is in an unhealthy state. In other examples, platform health determiner 214 determines that the platform is unhealthy based on an excessive CPU usage. In another example, platform health determiner 214 determines that the platform is unhealthy based on a responsiveness metric (e.g., slow to respond to network requests). Conversely, if the monitored parameters indicates that the platform is operating as intended (e.g., CPU usage is normal, memory usage is normal, etc.), platform health determiner 214 determines that the platform is in a healthy state. These are only illustrative, and platform health determiner 214 determines a health of the platform based on any combination of measures as defined by the platform, as appreciated by those skilled in the relevant arts.

In examples, platform health determiner 214 generates a third health signal 238 based on the determined health of hosting platform 110 and provides the third health signal to health signal collector 202. In various examples, the third health signal also includes additional information related to the third health signal, such as a reason for the healthy or unhealthy determination (e.g., whether the CPU usage was normal, whether memory usage was normal, etc.). In this manner, health signal collector 202 is configured to obtain third health signal 238 indicative of whether hosting platform that includes the service that consumed the configuration is healthy or unhealthy overall and/or additional information relating to the health of the platform.

Accordingly, in examples, health signal collector 202 is configured to obtain various health signals, each relating to a different dimension of the distribution of the configuration by a target. Health evaluator 204 is configured to obtain a set of health signals 230 from health signal collector 202 that comprises the health signals described herein (or any other health signals as appreciated by those skilled in the art) and determine an overall configuration distribution health 206 corresponding to the configuration.

In examples, health evaluator 204 determines configuration distribution health 206 based on any combination (or subset) of the signals in the set 230. In implementation, configuration distribution health 206 is determined to be healthy or unhealthy, based on the set of signals. For instance, configuration distribution health 206 is determined by health evaluator 206 to be healthy where one or more (or all) of the signals in set 230 are positive, healthy or otherwise indicate a success of the respective dimension (e.g., the delivery of the configuration was successful, the consumption was successful, and the platform was healthy following the consumption of the configuration). In another implementation, configuration distribution health 206 is determined to be unhealthy where any one or more of the signals are negative, unhealthy, or otherwise indicate a lack of success of the respective dimension (e.g., the delivery of the configuration was unsuccessful, the consumption was unsuccessful, or the platform was unhealthy following the consumption).

In some implementations, health evaluator 204 generates configuration distribution health 206 based at least in part on the associated information for any one more of the health signals obtained (e.g., error codes or other reasons received along with any of the health signals). In other implementations, the associated information is reported, along with configuration distribution health 206, to an endpoint such as distribution interface 120, such that the reason for the unhealthy configuration distribution can be identified and resolved. In other examples, a reason for the unhealthy configuration distribution is generated by health evaluator 204 and reported along with the configuration distribution health 206.

In examples, action executor 208 is configured to perform one or more actions based on configuration distribution health 206. In one implementation, action executor 208 provides a signal 232 to a rollback system 210. In examples, rollback system 210 comprises a component that enables a service and/or tenant to rollback the configuration to a LKG rollback state, such as the prior configuration in which the system and/or service were functioning properly. In some examples, such as where configuration distribution health 206 indicates that the configuration distribution is healthy, the signal 232 comprises an indication that the configuration associated with the configuration distribution should be identified as the one used for the LKG rollback state. Such an indication allows for the continued operation of the service in the future, such as where future configurations are faulty and an up-to-date rollback state is to be relied upon.

In another example, such as where the configuration distribution health indicates that the distribution was unhealthy, the signal comprises an indication that the configuration on service 116 (and/or one of the tenants therein) should be rollbacked to its LKG rollback state, thereby reducing the likelihood of a service outage and customer impact.

In another example, if the deployment is determined to be unhealthy for one or more machines based on any one or more of the signals described herein, an inference is made that the configuration is unhealthy and should not proceed with distribution to other targets, thereby reducing the likelihood of a service outage and customer impact. In addition, the foregoing techniques allow for granular deployment of configurations to targets, such a by deploying the configuration to a subset of targets and evaluating the health prior to further distributions of the configuration. This, in turn, mitigates the likelihood of distributing a faulty or unhealthy configuration on a large number of targets, as the health determination can be made for an initial (e.g., smaller) set of targets prior to a larger distribution. Thus, in contrast to other approaches that evaluate the operation of entire service following a distribution of configuration settings to all targets, disclosed techniques enable the evaluation of the health for each individual target during and/or after a configuration distribution, resulting in a more granular health assessment. Such techniques minimize or even avoid outages from occurring as a result of improper configurations, as unhealthy targets that consumed the configuration are readily identified before the configuration is distributed to an entire set of targets. In other words, an unhealthy configuration distribution is stopped or paused before it affects an entire fleet in various examples. As a result, disclosed techniques allow for effective management of a configuration distribution even where relatively large target fleets are involved.

In another example, action executor 208 generates a signal 234 to cause notifier 212 to generate a notification 236 to one or more endpoints, such as distribution interface 120. In examples, notification 236 comprises an identification of the configuration that was distributed, configuration distribution health 206 associated with the configuration, a hosting platform identifier, a computing resource identifier, a service identifier, a tenant identifier, and/or any other information associated with the distribution and/or consumption of the configuration (such as error codes, failure reasons, etc.).

In various embodiments, such information is provided to distribution interface 120, which comprises an interface utilized by an individual or other entity responsible for generating, distributing, or managing the configuration that was distributed. Other endpoints are also contemplated, such as service 116 (or any of tenants 226A-226N) associated with the configuration distribution. Distribution interface 120 comprises one or more interactive elements, that when selected by a user, perform one or more actions based on configuration health 206, such as continuing with the configuration distribution, pausing the configuration distribution, rolling back the configuration to a previous configuration, setting a new rollback point, etc.

In accordance with one or more embodiments, the health of a configuration distribution is determined such that various computer functions are improved. For example, FIG. 3 shows a flowchart 300 of a method for evaluating a health of a configuration distribution, in accordance with an example embodiment. In an embodiment, flowchart 300 is implemented by system 100 as shown in FIG. 1 and/or system 200 as shown in FIG. 2. Accordingly, flowchart 300 will be described with reference to FIGS. 1 and 2. Other structural and operational embodiments will be apparent to persons skilled in the relevant art(s) based on the following discussion regarding flowchart 300, system 100 of FIG. 1 and system 200 of FIG. 2.

Flowchart 300 begins with step 302. In step 302, a first health signal indicative of a transmission of configuration to a target computing resource is obtained. For instance, with reference to FIG. 2, health signal collector 202 is configured to obtain first health signal 240 indicative of a transmission of the configuration 228 to a target computing resource. In various examples, the first health signal comprises a signal indicative of a distribution health. For instance, the first health signal comprises a confirmation that target agent 114 has stored the configuration to storage 220 successfully or unsuccessfully.

In step 304, a second health signal indicative of a consumption of the configuration is obtained. For instance, with reference to FIG. 2, health signal collector 202 is configured to obtain second health signal 244 indicative of a consumption of the configuration distribution. In various examples, the second health signal comprises a confirmation that an entity of computing resource 112 (e.g., service 116 and/or one of the tenants associated therewith) has consumed the configuration and/or is in a healthy (or unhealthy) state after consuming the configuration (e.g., a target health signal, or a signal indicative of a consumption of the configuration by a target). Thus, while the first health signal relates to a first dimension of the distribution associated with a delivery (e.g., storage) of the configuration, the second health signal relates to a second dimension of the distribution associated with an actual consumption of the configuration (e.g., by a target).

In step 306, a third health signal indicative of a health of a computing platform that includes the target computing resource after the consumption is obtained. For instance, with reference to FIG. 2, health signal collector 202 is configured to obtain third health signal 238 from platform health determiner 214 indicative of a health of hosting platform 110 that includes computing resource 112. In various examples, the third health signal comprises a confirmation that hosting platform 110 of which computing resource 112 (and service 116 and/or tenants 226A-226N are a part) is healthy (or unhealthy) after the configuration was consumed (e.g., a platform health signal). In examples, the hosting platform 110 comprises a machine, cluster, etc. In an implementation, the third signal relates to a third dimension that is different from the first and second dimensions, in which the third dimension is associated with the health of an overall computing platform that contains (e.g., hosts or executes) the resource that consumed the configuration.

Accordingly, in various embodiments, health signal collector 202 obtains health signals across various dimensions relating to the distribution of a configuration, where each of the health signals relate to different health measures (e.g., the health of the delivery of the configuration, the health of the consumption of the configuration, and/or the health of the platform that contains the target that consumed the configuration).

In step 308, based on the first health signal, the second health signal, and the third health signal, the health of the configuration distribution is determined. For instance, with reference to FIG. 2, health evaluator 204 is configured to determine configuration distribution health 206 based at least on first health signal 240, second health signal 244, and/or third health signal 238. In various examples, configuration distribution health 206 comprises an overall measure of health for the configuration distribution, such as a determination of whether a target has effectively received and implemented a configuration (e.g., one or more adjustments that affect the behavior of service 116 and/or one or more of the associated tenants), and/or has done so in a manner that enabled hosting platform 110 to remain in a healthy state. In this manner, health evaluator 204 is configured to perform a cohesive distribution health check for a given configuration distribution.

By implementing a configuration distribution health check in such a manner (e.g., a health check that is performed in real-time or near-real time during and/or after a configuration is consumed), various computing functions can be improved as described herein. For instance, potential outages from faulty configurations can be mitigated or avoided, such as by preventing further distributions or consumptions of a configuration that is determined to be unhealthy. In another example, such as where a configuration distribution is healthy, the LKG rollback state can be updated with the distributed configuration, thus ensuring that resources can continue to operate with minimal to no outages should future configuration distributions be faulty.

In addition, disclosed techniques enable a configuration distribution infrastructure to confirm whether a distribution was successful, thereby allowing the infrastructure to ensure that a successful delivery of configuration settings is achieved (e.g., across a single region, across a plurality of regions, across multiple tenants, etc.). Other benefits and advantages will be appreciated by those skilled in the relevant arts and/or are described elsewhere herein.

As described above, one or more measures are performed based on the determination of a configuration distribution health. For example, FIG. 4 shows a flowchart 400 of a method for performing a system health action based on health determination, accordance with an example embodiment. In an embodiment, flowchart 400 is implemented by system 100 as shown in FIG. 1 and/or system 200 as shown in FIG. 2. Accordingly, flowchart 400 will be described with reference to FIGS. 1 and 2. Other structural and operational embodiments will be apparent to persons skilled in the relevant art(s) based on the following discussion regarding flowchart 400, system 100 of FIG. 1, and system 200 of FIG. 2.

Flowchart 400 begins with step 402. In step 402, a system health action is performed based on the health of the configuration distribution. For instance, with reference to FIG. 2, action executor 208 is configured to perform one or more system health actions based on a determination of configuration distribution health 206. As used herein, a system health action comprises an action that has a likelihood of improving the health of one or more components of hosting platform 110. In various embodiments, the system health action comprises an action performed in response to a healthy (or positive) configuration distribution health, or an unhealthy (or negative) configuration distribution health.

In one example, action executor 208 sends signal 234 to notifier 212 to generate notification 236 that is provided to one or more endpoints. In implementations, the notification comprises an indication of the distribution health (e.g., configuration distribution health 206) and/or any associated information, such as an identification of the target(s) that received and/or consumed the configuration, reasons for the healthy and/or unhealthy determination, and/or information associated with the various health signals that are obtained by health signal collector 202. In another example, action executor 208 prevents additional configuration distributions and/or consumptions from occurring based on an unhealthy configuration distribution health.

In various implementations therefore, different types of system health actions are performed based on a configuration distribution health. For example, FIG. 5 shows a flowchart 500 of a method for rolling back a configuration distribution based on a configuration distribution health, in accordance with an example embodiment. In an embodiment, flowchart 500 is implemented by system 100 as shown in FIG. 1 and/or system 200 as shown in FIG. 2. Accordingly, flowchart 500 will be described with reference to FIGS. 1 and 2. Other structural and operational embodiments will be apparent to persons skilled in the relevant art(s) based on the following discussion regarding flowchart 500, system 100 of FIG. 1, and system 200 of FIG. 2.

Flowchart 500 begins with step 502. In step 502, a determination is made, based on the health of a configuration distribution, that the configuration distribution resulted in an unhealthy state of a computing component. For instance, with reference to FIG. 2, action executor 208 determines, based on configuration distribution health 206, that the configuration distribution (e.g., as distributed and/or notified by configuration distributor 105) resulted in an unhealthy state of a computing component. In examples, the computing component comprises any component of hosting platform 110, including but not limited to, computing resource 112, service 116, and/or one or more of tenants 226A-226N. In examples, the unhealthy state of any such computing component is based on one or more of the signals received by health signal collector 202. In one example, the unhealthy state is based on a determination that service 116 and/or one or more of tenants 226A-226N failed to successfully consume the distributed configuration.

In another example, the unhealthy state is based on a determination that hosting platform 110 is not healthy (e.g., based on CPU usage, memory usage, latency, etc.) following a consumption of the configuration. These examples are only illustrative, and the unhealthy determination is based on any health measures detected and/or observed with respect to the transmission and/or consumption of the configuration as discussed herein.

In step 504, a rollback of the configuration distribution is performed in response to a determination that the configuration distribution resulted in an unhealthy state. For instance, with reference to FIG. 2, action executor sends signal 232 to rollback system 210 to perform a rollback of the configuration distribution in response to a determination that the configuration distribution resulted in an unhealthy state (e.g., that configuration distribution health 206 indicates that the distribution was unhealthy or negative). For instance, where the configuration distribution is unhealthy, signal 232 indicates to rollback system 210 to rollback one or more targets (e.g., that consumed the unhealthy configuration) to its LKG rollback point in order to minimize or avoid potential outages caused by the unhealthy (e.g., faulty) configuration distribution.

Figure 6:
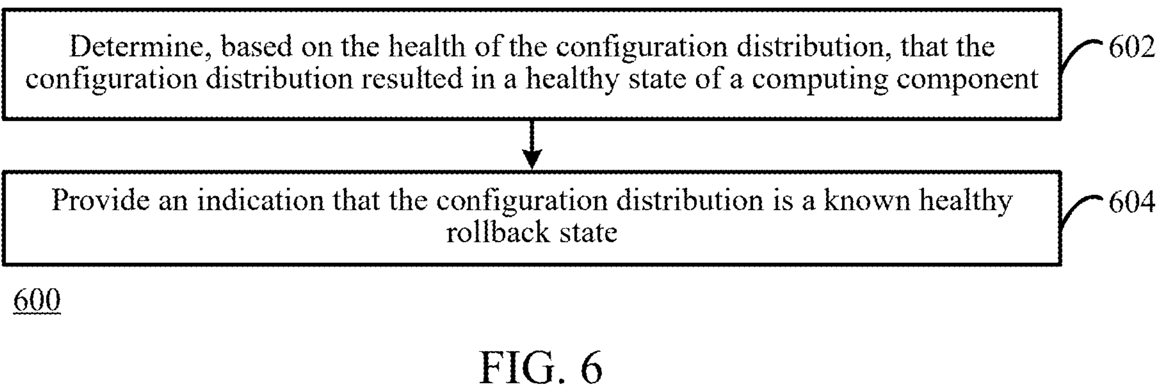
FIG. 6 shows a flowchart of a method for updating a rollback state based on a configuration distribution health, in accordance with an example embodiment.

In various other implementations, such as where the configuration distribution was healthy, a different action is performed. For example, FIG. 6 shows a flowchart 600 of a method for updating a rollback state based on a configuration distribution health, in accordance with an example embodiment. In an embodiment, flowchart 600 is implemented by system 100 as shown in FIG. 1 and/or system 200 as shown in FIG. 2. Accordingly, flowchart 600 will be described with reference to FIGS. 1 and 2. Other structural and operational embodiments will be apparent to persons skilled in the relevant art(s) based on the following discussion regarding flowchart 600, system 100 of FIG. 1, and system 200 of FIG. 2.

Flowchart 600 begins with step 602. In step 602, a determination is made, based on the configuration distribution health, that the configuration distribution resulted in a healthy state of a computing component. For instance, with reference to FIG. 2, action executor 208 determines, based on configuration distribution health 206, that the configuration distribution (e.g., as distributed and/or notified by configuration distributor 105) resulted in a healthy state of a computing component following consumption of configuration. In examples, the healthy state of a computing component (e.g., any one or more components of hosting platform 110) is based on one or more of the signals received by health signal collector 202. In one example, the unhealthy state is based on a determination that service 116 and/or one or more of tenants 226A-226N successfully consume the distributed configuration. In another example, the healthy state is based on a determination that hosting platform 110 is healthy (e.g., based on CPU usage, memory usage, latency, etc.) following a consumption of the configuration. These examples are only illustrative, and the healthy determination is based on any health measures detected and/or observed with respect to the transmission and/or consumption of the configuration as discussed herein.

It should also be noted that the healthy state of the computing component need not be directly caused or resulting from the distribution of the configuration. Rather, the configuration distribution health is determined to be healthy based on a determination that any one or more of the computing components are observed to be in a healthy state following consumption of the configuration. In other words, if the computing components are healthy before and after the consumption of the configuration, a determination is made that the computing components are in a healthy state following the consumption in example embodiments.

In step 604, an indication is provided that the configuration distribution is a known healthy rollback state. For instance, with reference to FIG. 2, signal 232 comprises an indication that the configuration distribution comprises a known healthy rollback state to rollback system 210. For example, where the configuration distribution is determined to be healthy, a LKG rollback state is updated based on the healthy configuration, such that this configuration is used as the most recent rollback state in the future. Such an action allows the rollback state to be continuously updated to maintain proper functioning of target resources in an up-to-date fashion.

Figure 7:
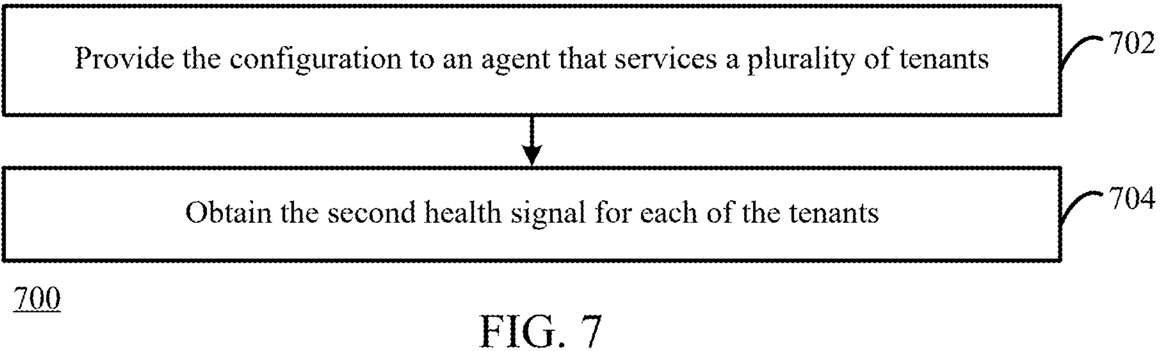
FIG. 7 shows a flowchart of a method for providing the configuration distribution to a plurality of tenants, in accordance with an example embodiment.

In accordance with an embodiment, service 116 is a multi-tenant service to which one or more configurations are distributed. For example, FIG. 7 shows a flowchart 700 of a method for providing the configuration distribution to a plurality of tenants, in accordance with an example embodiment. In an embodiment, flowchart 700 is implemented by system 100 as shown in FIG. 1 and/or system 200 as shown in FIG. 2. Accordingly, flowchart 700 will be described with reference to FIGS. 1 and 2. Other structural and operational embodiments will be apparent to persons skilled in the relevant art(s) based on the following discussion regarding flowchart 700, system 100 of FIG. 1, and system 200 of FIG. 2.

Flowchart 700 begins with step 702. In step 702, a configuration is provided to an agent that services a plurality of tenants. For instance, with reference to FIG. 2, configuration distributor 105 is configured to provide a configuration (and/or an indication thereof) to target agent 114 that services a plurality of tenants 226A-226N. In an embodiment, each of tenants 226A-226N comprises a namespace in a multi-tenant namespace (e.g., service 116). For instance, service 116 is utilized by a plurality of different tenants (e.g., subscribers that are unaffiliated with each other, such as different domains, organizations, clients, employers, etc.). Thus, in example embodiments, tenants 226A-226N are different tenants of a single cloud services provider (e.g., an entity that manages hosting platform 110). In one example, tenants 226A-226N are unrelated or independent tenants, such as entities lacking any meaningful business relationship with each other. While example embodiments are described in multi-tenant environments, it should be understood that disclosed techniques are also applicable to environments in which service 116 services a single tenant.

In an illustration, service 116 comprise one or more software resources (e.g., SaaS, PaaS, etc.), applications, storage resources, databases, etc. that are shared, at least partially, across different tenants. In one embodiment, computing resource 112 comprises a plurality of services (similar to service 116), with each service associated with a respective set of tenants. In other words, computing resource 112 can comprise a single machine that has multiple services (e.g., applications) executing, where each service has many different tenants. Thus, computing resource 112 includes multiple multi-tenant services in some embodiments.

In examples, each of tenant 226A-226N comprises a respective configuration associated therewith (e.g., a file or set of files for each tenant). For instance, a given tenant comprises one or more configurations (e.g., configuration files) that defines the behaviors on the services or applications that the tenant utilizes or subscribes to. Configuration distributor 105, in examples, is configured to notify target agent 114 of a configuration for distribution to any such tenant, such that one or more configurations of a tenant (or a plurality of tenants) are provided. In this manner, the configurations for a plurality of tenants is provided to target agent 114 concurrently, allowing for parallel distribution of configurations.

In step 704, the second health signal is obtained for each of the tenants. For instance, with reference to FIG. 2, configuration consumer 222 is configured to apply the configuration to each of tenants 226A-226N for which the configuration was intended. Consumption health determiner 224 determines, for each of the tenants, whether the tenant consumed the configuration successfully. Consumption health determiner 224 operates in a similar manner as described above. In this manner, a health determination is made for a plurality of different tenants relating to whether the configuration was consumed by each tenant successfully. Consumption health determiner 224 generates and provides a second health signal to health signal collector 202 for each such tenant, indicative of whether the tenant consumed the configuration successfully.

Based on such a determination, health evaluator 204 is configured to determine, on a tenant-by-tenant basis in some examples, whether the configuration distribution was successful.

It should also be noted that other health signals as described herein are generated on a tenant-by-tenant basis. For instance, target agent 114 is configured to determine whether the configuration stored for each individual tenant is successfully stored, and provide a health signal to health signal collector 202 for each individual tenant in some implementations.

III. Example Mobile Device and Computer System Implementation

Computing device 102, configuration distribution infrastructure 104, configuration distributor 105, health evaluation system 106, computing device 108, hosting platform 110, computing resource 112, target agent 114, service 116, computing device 118, distribution interface 120, health signal collector 202, health evaluator 204, configuration distribution health 206, action executor 208, rollback system 210, notifier 212, platform health determiner 214, delivery health determiner 216, timeout determiner 218, storage 220, configuration consumer 222, consumption health determiner 224, tenants 226A-226N, and/or configuration 228 are implemented in hardware, or hardware combined with one or both of software and/or firmware. For example, configuration distribution infrastructure 104, configuration distributor 105, health evaluation system 106, hosting platform 110, computing resource 112, target agent 114, service 116, distribution interface 120, health signal collector 202, health evaluator 204, configuration distribution health 206, action executor 208, rollback system 210, notifier 212, platform health determiner 214, delivery health determiner 216, timeout determiner 218, storage 220, configuration consumer 222, consumption health determiner 224, tenants 226A-226N, and/or configuration 228, and/or the components described therein, and/or the steps of flowcharts 300, 400, 500, 600, and/or 700 are each implemented as computer program code/instructions configured to be executed in one or more processors and stored in a computer readable storage medium. Alternatively, configuration distribution infrastructure 104, configuration distributor 105, health evaluation system 106, hosting platform 110, computing resource 112, target agent 114, service 116, distribution interface 120, health signal collector 202, health evaluator 204, configuration distribution health 206, action executor 208, rollback system 210, notifier 212, platform health determiner 214, delivery health determiner 216, timeout determiner 218, storage 220, configuration consumer 222, consumption health determiner 224, tenants 226A-226N, and/or configuration 228, and/or the components described therein, and/or the steps of flowcharts 300, 400, 600, and/or 700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 8:
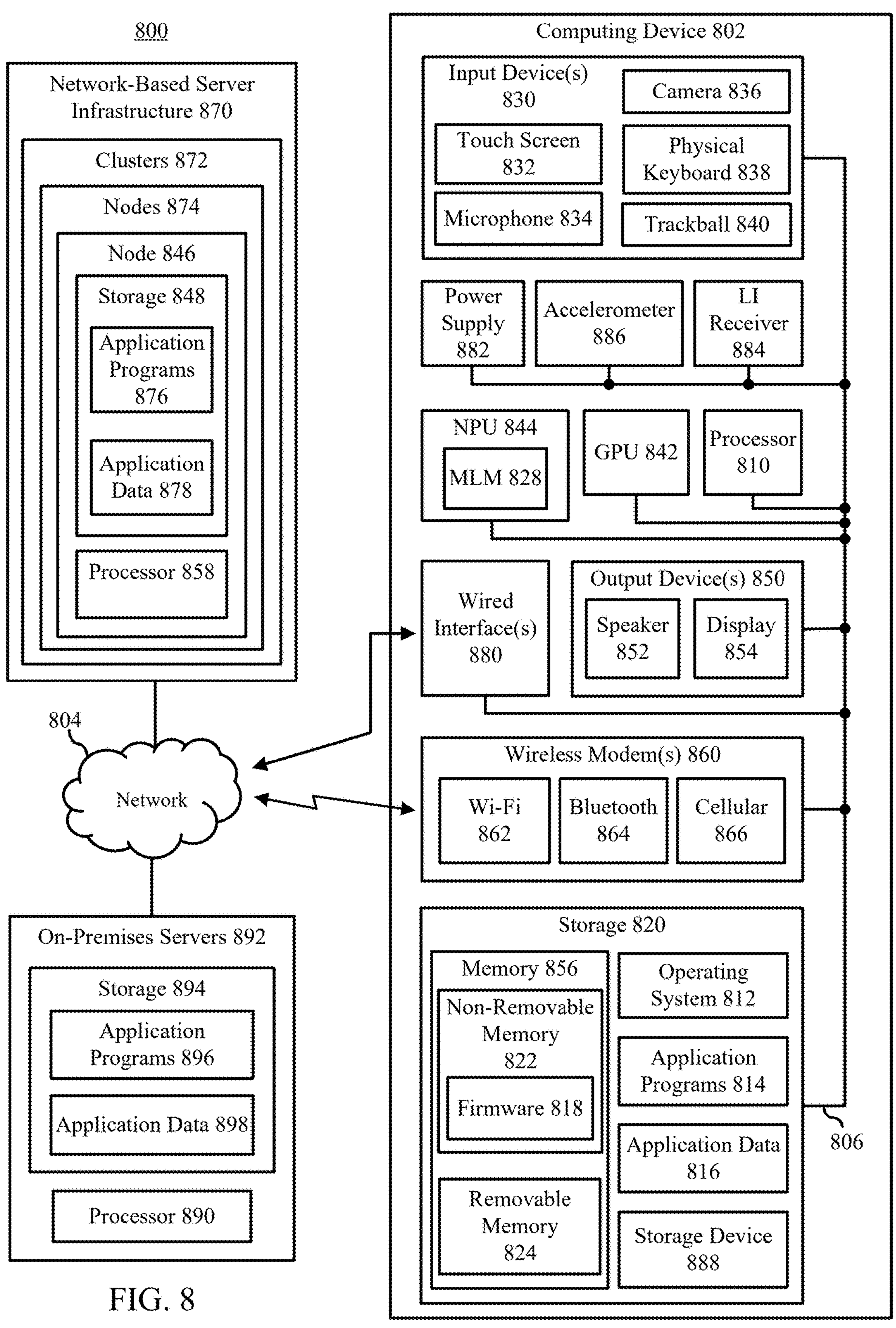
FIG. 8 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 8. FIG. 8 shows a block diagram of an exemplary computing environment 800 that includes a computing device 802. Computing device 802 is an example of computing device 102 and/or server 106, which each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc. In examples, network 804 includes one or more wired and/or wireless portions. In some examples, network 804 additionally or alternatively includes a cellular network for cellular communications. Computing device 802 is described in detail as follows.

Computing device 802 can be any of a variety of types of computing devices. Examples of computing device 802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 802 is a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, a graphics processing unit (GPU) 842, a neural processing unit (NPU) 844, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 888. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device (s) 830 includes a touch screen 832, a microphone 834, a camera 836, a physical keyboard 838, and a trackball 840. Not all components of computing device 802 shown in FIG. 8 are present in all embodiments, additional components not shown may be present, and in a particular embodiment any combination of the components are present. In examples, components of computing device 802 are mounted to a circuit card (e.g., a motherboard) of computing device 802, integrated in a housing of computing device 802, or otherwise included in computing device 802. The components of computing device 802 are described as follows.

In embodiments, a single processor 810 (e.g., central processing unit (CPU), microcontroller, a microprocessor, signal processor, ASIC (application specific integrated circuit), and/or other physical hardware processor circuit) or multiple processors 810 are present in computing device 802 for performing such tasks as program execution, signal coding, data processing, input/output processing, power control, and/or other functions. In examples, processor 810 is a single-core or multi-core processor, and each processor core is single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). In examples, application programs 814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 810 includes one or more general processors (e.g., CPUs) configured with or coupled to one or more hardware accelerators, such as one or more NPUs 844 and/or one or more GPUs 842.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) present to communicatively couple processor 810 to various other components of computing device 802, although in other embodiments, an alternative bus, further buses, and/or one or more individual signal lines is/are present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 888, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 822 includes main memory and is separate from or fabricated in a same integrated circuit as processor 810. As shown in FIG. 8, non-removable memory 822 stores firmware 818 that is present to provide low-level control of hardware. Examples of firmware 818 include BIOS (Basic Input/Output System, such as on personal computers) and boot firmware (e.g., on smart phones). In examples, removable memory 824 is inserted into a receptacle of or is otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 888 are present that are internal and/or external to a housing of computing device 802 and are or are not removable. Examples of storage device 888 include a hard disk drive, a SSD, a thumb drive (e.g., a USB (Universal Serial Bus) flash drive), or other physical storage device.

One or more programs are stored in storage 820. Such programs include operating system 812, one or more application programs 814, and other program modules and program data. Examples of such application programs include computer program logic (e.g., computer program code/instructions) for implementing configuration distribution infrastructure 104, configuration distributor 105, health evaluation system 106, hosting platform 110, computing resource 112, target agent 114, service 116, distribution interface 120, health signal collector 202, health evaluator 204, configuration distribution health 206, action executor 208, rollback system 210, notifier 212, platform health determiner 214, delivery health determiner 216, timeout determiner 218, storage 220, configuration consumer 222, consumption health determiner 224, tenants 226A-226N, and/or configuration 228, and/or each of the components described therein, as well as any of flowcharts 300, 400, 500, 600, and/or 700, and/or any individual steps thereof.

Storage 820 also stores data used and/or generated by operating system 812 and application programs 814 as application data 816. Examples of application data 816 include web pages, text, images, tables, sound files, video data, and other data. In examples, application data 816 is sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 802 through one or more input devices 830 and receives information from computing device 802 through one or more output devices 850. Input device(s) 830 includes one or more of touch screen 832, microphone 834, camera 836, physical keyboard 838 and/or trackball 840 and output device(s) 850 includes one or more of speaker 852 and display 854. Each of input device(s) 830 and output device(s) 850 are integral to computing device 802 (e.g., built into a housing of computing device 802) or are external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 displays information, as well as operating as touch screen 832 by receiving user commands and/or other information (e.g., by touch, finger gestures, virtual keyboard, etc.) as a user interface. Any number of each type of input device(s) 830 and output device(s) 850 are present, including multiple microphones 834, multiple cameras 836, multiple speakers 852, and/or multiple displays 854.

In embodiments where GPU 842 is present, GPU 842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 828. In an example, NPU 844 is configured for a data-driven parallel computing and is highly efficient at processing massive multimedia data such as videos and images and processing data for neural networks. NPU 844 is configured for efficient handling of AI-related tasks, such as speech recognition, background blurring in video calls, photo or video editing processes like object detection, etc.

In embodiments disclosed herein that implement ML models, NPU 844 can be utilized to execute such ML models, of which MLM 828 is an example. For instance, where applicable, MLM 828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 844 is used to train MLM 828. To train MLM 828, training data is that includes input features (attributes) and their corresponding output labels/target values (e.g., for supervised learning) is collected. A training algorithm is a computational procedure that is used so that MLM 828 learns from the training data. Parameters/weights are internal settings of MLM 828 that are adjusted during training by the training algorithm to reduce a difference between predictions by MLM 828 and actual outcomes (e.g., output labels). In some examples, MLM 828 is set with initial values for the parameters/weights. A loss function measures a dissimilarity between predictions by MLM 828 and the target values, and the parameters/weights of MLM 828 are adjusted to minimize the loss function. The parameters/weights are iteratively adjusted by an optimization technique, such as gradient descent. In this manner, MLM 828 is generated through training by NPU 844 to be used to generate inferences based on received input feature sets for particular applications. MLM 828 is generated as a computer program or other type of algorithm configured to generate an output (e.g., a classification, a prediction/inference) based on received input features, and is stored in the form of a file or other data structure.

In examples, such training of MLM 828 by NPU 844 is supervised or unsupervised. According to supervised learning, input objects (e.g., a vector of predictor variables) and a desired output value (e.g., a human-labeled supervisory signal) train MLM 828. The training data is processed, building a function that maps new data on expected output values. Example algorithms usable by NPU 844 to perform supervised training of MLM 828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 828 is an LLM, MLM 828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 828 is trained to learn patterns from unlabeled data. For instance, in embodiments where MLM 828 implements unsupervised learning techniques, MLM 828 identifies one or more classifications or clusters to which an input belongs. During a training phase of MLM 828 according to unsupervised learning, MLM 828 tries to mimic the provided training data and uses the error in its mimicked output to correct itself (i.e., correct weights and biases). In further examples, NPU 844 perform unsupervised training of MLM 828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 844 need not necessarily be present in all ML model embodiments. In embodiments where ML models are present, any one or more of processor 810, GPU 842, and/or NPU 844 can be present to train and/or execute MLM 828.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). In examples, wireless modem 860 also or alternatively includes other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and receives power from a battery internal to computing device 802, and/or from a power cord plugged into a power port of computing device 802 (e.g., a USB port, an A/C power port). LI receiver 884 is useable for location determination of computing device 802 and in examples includes a satellite navigation receiver such as a Global Positioning System (GPS) receiver and/or includes other type of location determiner configured to determine location of computing device 802 based on received information (e.g., using cell tower triangulation, etc.). Accelerometer 886, when present, is configured to determine an orientation of computing device 802.

Note that the illustrated components of computing device 802 are not required or all-inclusive, and fewer or greater numbers of components can be present as would be recognized by one skilled in the art. In examples, computing device 802 includes one or more of a gyroscope, barometer, proximity sensor, ambient light sensor, digital compass, etc. In an example, processor 810 and memory 856 are co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein is stored in storage 820 and executed by processor 810.

In some embodiments, server infrastructure 870 is present in computing environment 800 and is communicatively coupled with computing device 802 via network 804. Server infrastructure 870, when present, is a network-accessible server set (e.g., a cloud-based environment or platform). As shown in FIG. 8, server infrastructure 870 includes clusters 872. Each of clusters 872 comprises a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. In examples, any of nodes 874 is a storage node that comprises a plurality of physical storage disks, SSDs, and/or other physical storage devices that are accessible via network 804 and are configured to store data associated with the applications and services managed by nodes 874.

Each of nodes 874, as a compute node, comprises one or more server computers, server systems, and/or computing devices. For instance, a node 874 in accordance with an embodiment includes one or more of the components of computing device 802 disclosed herein. Each of nodes 874 is configured to execute one or more software applications (or "applications") and/or services and/or manage hardware resources (e.g., processors, memory, etc.), which are utilized by users (e.g., customers) of the network-accessible server set. In examples, as shown in FIG. 8, nodes 874 includes a node 846 that includes storage 848 and/or one or more of a processor 858 (e.g., similar to processor 810, GPU 842, and/or NPU 844 of computing device 802). Storage 848 stores application programs 876 and application data 878. Processor(s) 858 operate application programs 876 which access and/or generate related application data 878. In an implementation, nodes such as node 846 of nodes 874 operate or comprise one or more virtual machines, with each virtual machine emulating a system architecture (e.g., an operating system), in an isolated manner, upon which applications such as application programs 876 are executed.

In embodiments, one or more of clusters 872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 872 are included in a datacenter in a distributed collection of datacenters. In embodiments, exemplary computing environment 800 comprises part of a cloud-based platform.

In an embodiment, computing device 802 accesses application programs 876 for execution in any manner, such as by a client application and/or a browser at computing device 802.

In an example, for purposes of network (e.g., cloud) backup and data security, computing device 802 additionally and/or alternatively synchronizes copies of application programs 814 and/or application data 816 to be stored at network-based server infrastructure 870 as application programs 876 and/or application data 878. In examples, operating system 812 and/or application programs 814 include a file hosting service client configured to synchronize applications and/or data stored in storage 820 at network-based server infrastructure 870.

In some embodiments, on-premises servers 892 are present in computing environment 800 and are communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 can be shared by on-premises servers 892 between computing devices of the organization, including computing device 802 (when part of an organization) through a local network of the organization, and/or through further networks accessible to the organization (including the Internet). Furthermore, in examples, on-premises servers 892 serve applications such as application programs 896 to the computing devices of the organization, including computing device 802. Accordingly, in examples, on-premises servers 892 include storage 894

(which includes one or more physical storage devices such as storage disks and/or SSDs) for storage of application programs 896 and application data 898 and include a processor 890 (e.g., similar to processor 810, GPU 842, and/or NPU 844 of computing device 802) for execution of application programs 896. In some embodiments, multiple processors 890 are present for execution of application programs 896 and/or for other purposes. In further examples, computing device 802 is configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 is used to implement systems, clients, or devices, or components/subcomponents thereof, disclosed elsewhere herein. In other embodiments, a combination of computing device 802, network-based server infrastructure 870, and/or on-premises servers 892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) are stored in storage 820. Such computer programs can also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

A system for evaluating a health of a configuration distribution is disclosed herein. The system includes: a processor; and a memory device that stores program code structured to cause the processor to: obtain a first health signal indicative of a transmission of the configuration to a target computing resource; obtain a second health signal indicative of a consumption of the configuration; obtain a third health signal indicative of a health of a computing platform that includes the target computing resource after the consumption; and based on the first health signal, the second health signal, and the third health signal, determine the health of the configuration distribution.

In one embodiment of the foregoing system, the program code is structured to cause the processor to perform a system health action based on the health of the configuration distribution.

In another embodiment of the foregoing system, the program code is structured to cause the processor to: determine, based on the health of the configuration distribution, that the configuration distribution resulted in an unhealthy state of a computing component; and perform a rollback of the configuration distribution in response to the determination that the configuration distribution resulted in the unhealthy state.

In another embodiment of the foregoing system, program code is structured to cause the processor to: determine, based on the health of the configuration distribution, that the configuration distribution resulted in a healthy state of a computing component; and provide an indication that the configuration distribution is a known healthy rollback state.

In another embodiment of the foregoing system, the program code is structured to cause the processor to: provide the configuration to an agent that services a plurality of tenants; and obtain the second health signal for each of the tenants.

In another embodiment of the foregoing system, the first health signal is indicative of a successful delivery of the configuration to a storage.

In another embodiment of the foregoing system, the second health signal is indicative of a successful consumption of the configuration.

In another embodiment of the foregoing system, the program code is structured to cause the processor to: receive the second health signal from an agent indicating that the consumption of the configuration distribution was unsuccessful, the second health signal generated after a timeout period has passed in which a target failed to respond with consumption health information.

In another embodiment of the foregoing system, the third health signal indicative of the health of the computing platform is based on a health of one or more of a processing resource, storage resource, or networking resource.

A method for evaluating a health of a configuration distribution is disclosed herein. The method includes: obtaining a first health signal indicative of a transmission of the configuration to a target computing resource; obtaining a second health signal indicative of a consumption of the configuration; obtaining a third health signal indicative of a health of a computing platform that includes the target computing resource after the consumption; and based on the first health signal, the second health signal, and the third health signal, determining the health of the configuration distribution.

In one embodiment of the foregoing method, the method further comprises: performing a system health action based on the health of the configuration distribution.

In another embodiment of the foregoing method, the method further comprises: determining, based on the health of the configuration distribution, that the configuration distribution resulted in an unhealthy state of a computing component; and performing a rollback of the configuration distribution in response to the determination that the configuration distribution resulted in the unhealthy state.

In another embodiment of the foregoing method, the method further comprises: determining, based on the health of the configuration distribution, that the configuration distribution resulted in a healthy state of a computing component; and providing an indication that the configuration distribution is a known healthy rollback state.

In another embodiment of the foregoing method, the first health signal is indicative of a successful delivery of the configuration to a storage.

In another embodiment of the foregoing method, the second health signal is indicative of a successful consumption of the configuration.

In another embodiment of the foregoing method, the third health signal indicative of the health of the computing platform is based on a health of one or more of a processing resource, storage resource, or networking resource.

A computer-readable storage medium is disclosed herein. The computer-readable storage medium has computer program code recorded thereon that when executed by at least one processor causes the at least one processor to perform a method comprising: obtaining a first health signal indicative of a transmission of the configuration to a target computing resource; obtaining a second health signal indicative of a consumption of the configuration; obtaining a third health signal indicative of a health of a computing platform that includes the target computing resource after the consumption; and based on the first health signal, the second health signal, and the third health signal, determining the health of the configuration distribution.

In one embodiment of the foregoing computer-readable storage medium, the method further comprises: performing a system health action based on the health of the configuration distribution.

In another embodiment of the foregoing computer-readable storage medium, the method further comprises: determining, based on the health of the configuration distribution, that the configuration distribution resulted in an unhealthy state of a computing component; and performing a rollback of the configuration distribution in response to the determination that the configuration distribution resulted in the unhealthy state.

In another embodiment of the foregoing computer-readable storage medium, the method further comprises: determining, based on the health of the configuration distribution, that the configuration distribution resulted in a healthy state of a computing component; and providing an indication that the configuration distribution is a known healthy rollback state.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A system for evaluating a health of a configuration distribution, the system comprising:

a processor; and a memory device that stores program code structured to cause the processor to:

obtain a first health signal indicative of a transmission of a plurality of configurations to a target computing resource, each configuration associated with a particular tenant in a multi-tenant namespace of a cloud system;

obtain a plurality of second health signals, each of the second health signals corresponding to a particular tenant in the multi-tenant namespace indicative of a consumption of the configuration by the particular tenant;

obtain a third health signal indicative of a health of a computing platform that includes the target computing resource after the consumption;

based on the first health signal, the plurality of second health signals, and the third health signal, determine the health of the configuration distribution;

determine, based on the health of the configuration distribution, that the configuration distribution resulted in an unhealthy state of a computing component; and based on the determination that the configuration distribution resulted in the unhealthy state, perform one or more of:

pausing the configuration distribution, or performing a rollback of the configuration distribution.

2. The system of claim 1, wherein the program code is structured to cause the processor to perform a system health action based on the health of the configuration distribution.

3. The system of claim 1, wherein the program code is structured to cause the processor to:

provide the configuration to an agent that services a plurality of tenants in the multi-tenant namespace.

4. The system of claim 1, wherein the first health signal is indicative of a successful delivery of the configuration to a storage.

5. The system of claim 1, wherein each of the plurality of second health signals are indicative of a successful consumption of the configuration.

6. The system of claim 5, wherein the program code is structured to cause the processor to:

receive a particular one of the second health signals from an agent indicating that the consumption of the configuration distribution by one of the tenants in the multi-tenant namespace was unsuccessful, the particular one of the second health signals generated after a timeout period has passed in which a target failed to respond with consumption health information.

7. The system of claim 1, wherein the third health signal indicative of the health of the computing platform is based on a health of one or more of a processing resource, storage resource, or networking resource.

8. A method for evaluating a health of a configuration distribution, the method comprising:

obtaining a first health signal indicative of a transmission of a plurality of configurations to a target computing resource, each configuration associated with a particular tenant in a multi-tenant namespace of a cloud system;

obtaining a plurality of second health signals, each of the second health signals corresponding to a particular tenant in the multi-tenant namespace indicative of a consumption of the configuration by the particular tenant;

obtaining a third health signal indicative of a health of a computing platform that includes the target computing resource after the consumption;

based on the first health signal, the plurality of second health signals, and the third health signal, determining the health of the configuration distribution;

determining, based on the health of the configuration distribution, that the configuration distribution resulted in an unhealthy state of a computing component; and based on the determination that the configuration distribution resulted in the unhealthy state, performing one or more of:

pausing the configuration distribution, or performing a rollback of the configuration distribution.

9. The method of claim 8, further comprising:

performing a system health action based on the health of the configuration distribution.

10. The method of claim 8, wherein the first health signal is indicative of a successful delivery of the configuration to a storage.

11. The method of claim 8, wherein each of the second health signals are indicative of a successful consumption of the configuration.

12. The method of claim 8, wherein the third health signal indicative of the health of the computing platform is based on a health of one or more of a processing resource, storage resource, or networking resource.

13. A computer-readable storage medium having computer program code recorded thereon that when executed by at least one processor causes the at least one processor to perform a method comprising:

obtaining a first health signal indicative of a transmission of a plurality of configurations to a target computing resource, each configuration associated with a particular tenant in a multi-tenant namespace of a cloud system;

obtaining a plurality of second health signal, each of the second health signals corresponding to a particular tenant in the multi-tenant namespace indicative of a consumption of the configuration by the particular tenant;

obtaining a third health signal indicative of a health of a computing platform that includes the target computing resource after the consumption; and based on the first health signal, the plurality of second health signals, and the third health signal, determining the health of the configuration distribution;

determining, based on the health of the configuration distribution, that the configuration distribution resulted in an unhealthy state of a computing component; and based on the determination that the configuration distribution resulted in the unhealthy state, performing one or more of:

pausing the configuration distribution, or performing a rollback of the configuration distribution.

14. The computer-readable storage medium of claim 13, wherein the method further comprises:

performing a system health action based on the health of the configuration distribution.

15. The method of claim 11, further comprising:

receiving a particular one of the second health signals from an agent indicating that the consumption of the configuration distribution by one of the tenants in the multi-tenant namespace was unsuccessful, the particular one of the second health signals generated after a timeout period has passed in which a target failed to respond with consumption health information.

16. The method of claim 8, further comprising:

providing the configuration to an agent that services a plurality of tenants in the multi-tenant namespace.

17. The computer-readable storage medium of claim 13, wherein the first health signal is indicative of a successful delivery of the configuration to a storage.

18. The computer-readable storage medium of claim 13, wherein each of the second health signals are indicative of a successful consumption of the configuration.

19. The computer-readable storage medium of claim 13, wherein the third health signal indicative of the health of the computing platform is based on a health of one or more of a processing resource, storage resource, or networking resource.

20. The computer-readable storage medium of claim 13, wherein the method further comprises:

providing the configuration to an agent that services a plurality of tenants in the multi-tenant namespace.

* * * * *